US012773957B2

(12) United States Patent
Li et al.

(10) Patent No.: US 12,773,957 B2
(45) Date of Patent: Oct. 27, 2026

(54) VEHICLE-MOUNTED AUDIO PLAYING METHOD AND APPARATUS, MULTIMEDIA HOST, AND STORAGE MEDIUM

(71) Applicant: BYD COMPANY LIMITED, Shenzhen (CN)

(72) Inventors: Faxi Li, Shenzhen (CN); Dongsheng Yang, Shenzhen (CN); Juan Liu, Shenzhen (CN); Lihua Wu, Shenzhen (CN); Yongpan Wang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 289 days.

(21) Appl. No.: 18/531,254

(22) Filed: Dec. 6, 2023

(65) Prior Publication Data

US 2024/0132002 A1 Apr. 25, 2024
US 2024/0227702 A9 Jul. 11, 2024

Related U.S. Application Data

(63) Continuation of application No. PCT/CN2022/101977, filed on Jun. 28, 2022.

(30) Foreign Application Priority Data

Jul. 21, 2021 (CN) ......................... 202110827109.2

(51) Int. Cl.
*B60R 16/023* (2006.01)
*B60Q 5/00* (2006.01)
(Continued)

(52) U.S. Cl.
CPC .............. *B60R 16/023* (2013.01); *B60Q 5/00* (2013.01); *G10H 1/365* (2013.01); *G10H 1/366* (2013.01); *G10H 1/44* (2013.01); *G10H 1/46* (2013.01)

(58) Field of Classification Search
CPC .......... G10H 1/365; G10H 1/366; G10H 1/44; G10H 1/46
See application file for complete search history.

(56) References Cited

U.S. PATENT DOCUMENTS 10,332,495 B1 * 6/2019 Mortensen ........... G10H 1/0008
2006/0050894 A1 * 3/2006 Boddicker ............. G10H 1/361 381/86
2018/0316997 A1 * 11/2018 Benun ...................... A63H 5/00

FOREIGN PATENT DOCUMENTS

CN 2314557 Y * 4/1999
CN 201261432 6/2009
(Continued)

OTHER PUBLICATIONS

Notice of Reasons for Refusal dated Jun. 17, 2025, issued in related Japanese Patent Application No. 2023-572529, with English machine translation (9 pages).
(Continued)

*Primary Examiner* — Carolyn R Edwards
*Assistant Examiner* — Dylan Maguire Neece
(74) *Attorney, Agent, or Firm* — Sheppard Mullin Richter & Hampton LLP

(57) ABSTRACT

Disclosed are a vehicle-mounted audio playing method and apparatus, a multimedia host, and a storage medium. The vehicle-mounted audio playing method includes: obtaining, by the multimedia host through a receiver, a first voice signal collected by a mobile microphone; and when the vehicle-mounted audio playing apparatus is in an out-of-vehicle karaoke mode, fusing, by the multimedia host, the first voice signal and an accompaniment signal, and outputting a fused signal to an out-of-vehicle speaker after performing amplification processing through a power amplifier, to drive the out-of-vehicle speaker to produce sound.

19 Claims, 5 Drawing Sheets

(51) Int. Cl.

| | |
|---|---|
| ***G10H 1/36*** | (2006.01) |
| ***G10H 1/44*** | (2006.01) |
| ***G10H 1/46*** | (2006.01) |

(56) References Cited

FOREIGN PATENT DOCUMENTS

| | | | | | |
|---|---|---|---|---|---|
| CN | 202480977 | | | 10/2012 | |
| CN | 202480977 | U | * | 10/2012 | |
| CN | 108648734 | A | | 10/2018 | |
| CN | 208509241 | U | | 2/2019 | |
| CN | 110706683 | | | 1/2020 | |
| CN | 111968611 | A | | 11/2020 | |
| JP | S5669146 | U | | 6/1981 | |
| JP | 2005-072880 | A | | 3/2005 | |
| JP | 2008216398 | | | 9/2008 | |
| JP | 2008216399 | | | 9/2008 | |
| JP | 2015-143750 | A | | 8/2015 | |
| JP | 6153149 | B1 | | 6/2017 | |
| JP | 2018165091 | A | | 10/2018 | |
| JP | 2020012935 | A | * | 1/2020 | ............. G10H 1/361 |
| TW | M576977 | U | | 4/2019 | |

OTHER PUBLICATIONS

International Search Report and Written Opinion for Application No. PCT/CN2022/101977, mailed on Sep. 28, 2022, 11 pages.

* cited by examiner

VEHICLE-MOUNTED AUDIO PLAYING METHOD AND APPARATUS, MULTIMEDIA HOST, AND STORAGE MEDIUM

CROSS-REFERENCE TO RELATED APPLICATIONS

This application is a Continuation application of International Patent Application No. PCT/CN2022/101977, filed on Jun. 28, 2022, which is based on and claims priority to and benefits of Chinese Patent Application No. 202110827109.2, filed on Jul. 21, 2021. The entire content of the above-referenced applications is incorporated herein by reference.

FIELD

The present disclosure relates to a vehicle-mounted audio playing method and apparatus, a multimedia host, and a storage medium.

BACKGROUND

With improvement of vehicle-mounted intelligent terminals, there are increasingly more application scenarios of cars. A vehicle-mounted multimedia host can not only implement functions such as intelligence voice interaction and Bluetooth call, but also implement vehicle-mounted entertainment, like lecture or karaoke.

SUMMARY

Embodiments of the present disclosure provide a vehicle-mounted audio playing method and apparatus, a multimedia host, and a storage medium, which can meet user's multi-scenario use requirements.

A first aspect of the embodiments of the present disclosure provides a vehicle-mounted audio playing method applied to a vehicle-mounted audio playing apparatus, the vehicle-mounted audio playing apparatus including a mobile microphone, a receiver, a multimedia host, a power amplifier, and an out-of-vehicle speaker. The method includes:

obtaining, by the multimedia host through the receiver, a first voice signal collected by the mobile microphone; and when the vehicle-mounted audio playing apparatus is in an out-of-vehicle karaoke mode, fusing, by the multimedia host, the first voice signal and an accompaniment signal, and outputting a fused signal to the out-of-vehicle speaker after performing amplification processing through the power amplifier, to drive the out-of-vehicle speaker to produce sound.

In some embodiments, the vehicle-mounted audio playing apparatus further includes an in-vehicle speaker, and the fused signal is further amplified through the power amplifier and then outputted to the in-vehicle speaker, to drive the in-vehicle speaker to produce sound.

In some embodiments, the method further includes: when the vehicle-mounted audio playing apparatus is in an out-of-vehicle lecture mode, outputting, by the multimedia host, the first voice signal to the out-of-vehicle speaker after performing amplification processing through the power amplifier, to drive the out-of-vehicle speaker to produce sound; or outputting, by the multimedia host, the first voice signal to the out-of-vehicle speaker and the in-vehicle speaker after performing amplification processing through the power amplifier, to drive the out-of-vehicle speaker and the in-vehicle speaker to produce sound.

In some embodiments, the method further includes: when the vehicle-mounted audio playing apparatus is in an in-vehicle karaoke mode, fusing, by the multimedia host, the first voice signal and the accompaniment signal, and outputting a fused signal to the in-vehicle speaker after performing amplification processing through the power amplifier, to drive the in-vehicle speaker to produce sound; and when the vehicle-mounted audio playing apparatus is in an in-vehicle lecture mode, outputting, by the multimedia host, the first voice signal to the in-vehicle speaker after performing amplification processing through the power amplifier, to drive the in-vehicle speaker to produce sound.

In some embodiments, the fusing, by the multimedia host, the first voice signal and an accompaniment signal includes: performing, by the multimedia host, audio mixing processing on the first voice signal and the accompaniment signal; or performing, by the multimedia host, tuning processing on the first voice signal and the accompaniment signal, and performing audio mixing processing on the first voice signal on which audio mixing processing is performed and the accompaniment signal on which audio mixing processing is performed.

In some embodiments, the vehicle-mounted audio playing apparatus further includes a display screen; and the multimedia host receives, through the display screen, a mode selection instruction inputted by a user.

In some embodiments, the vehicle-mounted audio playing apparatus further includes a voice microphone; and the method further includes: setting one of the voice microphone and the mobile microphone as a prime focus according to a working mode of the vehicle-mounted audio playing apparatus, where voice collected by a microphone that is set as the prime focus is allowed to produce sound through a speaker, and voice collected by a microphone that is not set as the prime focus is prohibited from producing sound through a speaker.

In some embodiments, the setting one of the voice microphone and the mobile microphone as a prime focus according to a working mode of the vehicle-mounted audio playing apparatus includes: when the vehicle-mounted audio playing apparatus is in an intelligent voice mode or a Bluetooth phone mode, setting, by the multimedia host, the voice microphone as the prime focus; and processing, by the multimedia host, a second voice signal collected by the voice microphone, and outputting a processed signal to the in-vehicle speaker after performing amplification processing through the power amplifier, to drive the in-vehicle speaker to produce sound; and when the vehicle-mounted audio playing apparatus is in the out-of-vehicle karaoke mode, setting, by the multimedia host, the mobile microphone as the prime focus; and performing, by the multimedia host, the step of fusing the first voice signal and the accompaniment signal, and outputting the fused signal to the out-of-vehicle speaker after performing amplification processing through the power amplifier, to drive the out-of-vehicle speaker to produce sound.

In some embodiments, a priority of the intelligent voice mode is higher than a priority of the out-of-vehicle karaoke mode, and a priority of the Bluetooth phone mode is higher than the priority of the out-of-vehicle karaoke mode; and when there is a conflict between at least two modes, a mode with a higher priority is entered.

A second aspect of the embodiments of the present disclosure provides a vehicle-mounted audio playing apparatus, including: a mobile microphone, a receiver, a multimedia host, a power amplifier, and an out-of-vehicle speaker.

The multimedia host is configured to obtain, through the receiver, a first voice signal collected by the mobile microphone.

The multimedia host is further configured to: when the vehicle-mounted audio playing apparatus is in an out-of-vehicle karaoke mode, fuse the first voice signal and an accompaniment signal, and output a fused signal to the out-of-vehicle speaker after performing amplification processing through the power amplifier, to drive the out-of-vehicle speaker to produce sound.

In some embodiments, the vehicle-mounted audio playing apparatus further includes an in-vehicle speaker, and the fused signal is further amplified through the power amplifier and then outputted to the in-vehicle speaker, to drive the in-vehicle speaker to produce sound.

In some embodiments, the vehicle-mounted audio playing apparatus further includes a display screen; and the multimedia host is further configured to receive, through the display screen, a mode selection instruction inputted by a user, to select the out-of-vehicle karaoke mode.

In some embodiments, the vehicle-mounted audio playing apparatus further includes a voice microphone. The multimedia host is configured to set the voice microphone as a prime focus when the vehicle-mounted audio playing apparatus is in an intelligent voice mode or a Bluetooth phone mode. When the voice microphone is set as the prime focus, voice collected by the voice microphone is allowed to produce sound through a speaker, and voice collected by the mobile microphone is prohibited from producing sound through a speaker. The multimedia host is configured to set the mobile microphone as a prime focus when the vehicle-mounted audio playing apparatus is in the out-of-vehicle karaoke mode. When the mobile microphone is set as the prime focus, voice collected by the mobile microphone is allowed to produce sound through the speaker, and voice collected by the voice microphone is prohibited from producing sound through the speaker.

A third aspect of the embodiments of the present disclosure provides a multimedia host, including:

- a receiving unit, configured to obtain, through a receiver, a first voice signal collected by a mobile microphone; and
- a fusion processing unit, further configured to: in an out-of-vehicle karaoke mode, fuse the first voice signal and an accompaniment signal, and output a fused signal to an out-of-vehicle speaker after performing amplification processing through a power amplifier, to drive the out-of-vehicle speaker to produce sound.

A fourth aspect of the embodiments of the present disclosure provides a multimedia host, including a processor and a memory, the memory being configured to store a computer program, the computer program including program instructions, and the processor is configured to invoke the program instructions to perform the steps in the first aspect of the embodiments of the present disclosure.

A fifth aspect of the embodiments of the present disclosure provides a computer-readable storage medium, where the computer-readable storage medium stores a computer program for electronic data interchange, and the computer program enables a computer to perform some or all steps described in the first aspect of the embodiments of the present disclosure.

A sixth aspect of the embodiments of the present disclosure provides a computer program product, where the computer program product includes a computer program, and the computer program is operable to enable a computer to perform some or all steps described in the first aspect of the embodiments of the present disclosure. The computer program product may be a software installation package.

Details of one or more embodiments of the present disclosure are provided in the subsequent accompanying drawings and descriptions. Other features and advantages of the present disclosure become obvious with reference to the specification, the accompanying drawings, and the claims.

BRIEF DESCRIPTION OF THE DRAWINGS

To describe the technical solutions of the embodiments of the present disclosure or the related art more clearly, the accompanying drawings required for describing the embodiments or the related art are briefly introduced below. The accompanying drawings in the following description show merely some embodiments of the present disclosure, and a person of ordinary skill in the art may still derive other drawings from these accompanying drawings without creative efforts.

DETAILED DESCRIPTION

A current karaoke system is only applicable to a scenario in which a user sings karaoke in a vehicle, but cannot meet user's requirements in other scenarios.

The technical solutions in the embodiments of the present disclosure are described below with reference to the accompanying drawings in the embodiments of the present disclosure. The described embodiments are merely some rather than all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", or the like are intended to distinguish between different objects but do not indicate a particular order. In addition, the terms "include", "have", and any variant thereof are intended to cover a non-exclusive inclusion. For example, a process, method, system, product, or device that includes a series of steps or units is not limited to the listed steps or units, but further optionally includes a step or unit that is not listed, or further optionally includes another step or unit that is intrinsic to the process, method, product, or device.

"Embodiment" mentioned in the present disclosure means that particular features, structures, or characteristics described with reference to the embodiment may be included in at least one embodiment of the present disclosure. The term appearing at different positions of the specification may not refer to the same embodiment or an independent or alternative embodiment that is mutually exclusive with another embodiment. A person skilled in the art explicitly or implicitly understands that the embodiments described in the present disclosure may be combined with other embodiments.

Figure 1A:
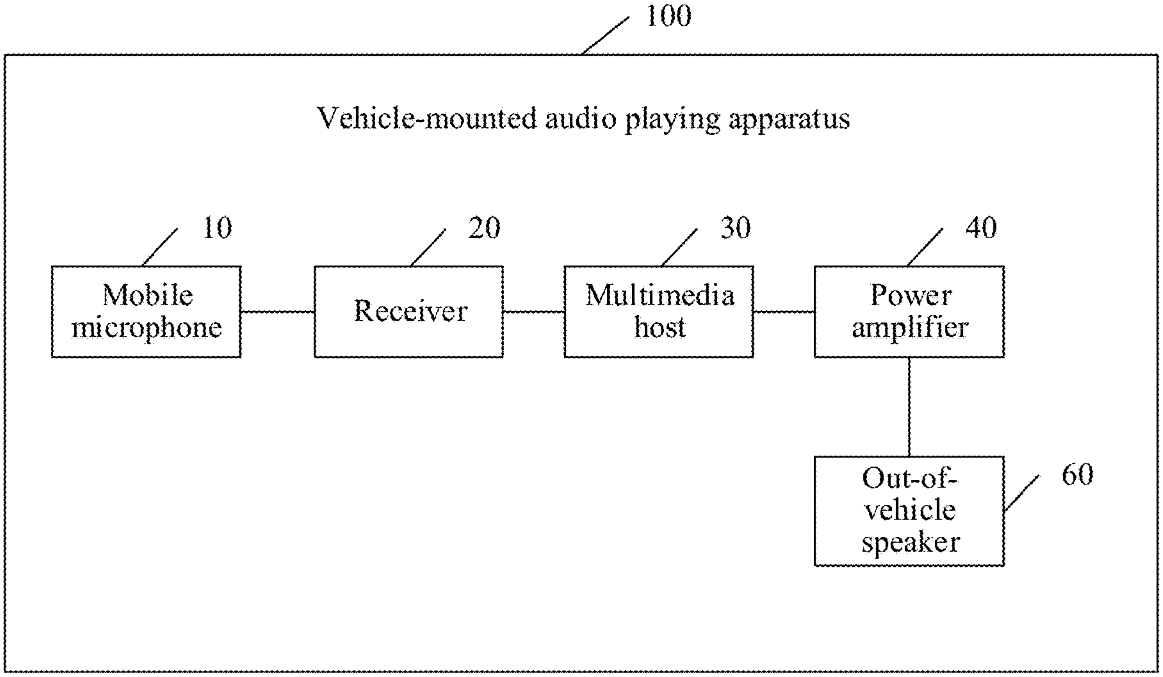
FIG. 1A is a schematic structural diagram of a vehicle-mounted audio playing apparatus according to an embodiment of the present disclosure.

Referring to FIG. 1A, FIG. 1A is a schematic structural diagram of a vehicle-mounted audio playing apparatus according to an embodiment of the present disclosure. As shown in FIG. 1A, the vehicle-mounted audio playing apparatus 100 may include a mobile microphone 10, a receiver 20, a multimedia host 30, a power amplifier 40, and an out-of-vehicle speaker 60.

After collecting a voice signal, the mobile microphone may transmit the collected voice signal to the receiver in a wireless communication manner. The receiver may process the voice signal and then transmit the voice signal to the multimedia host.

In an embodiment, the mobile microphone 10 may be connected to the receiver 20 through wireless communication. The wireless communication connection may include any one of a Bluetooth connection, a Wi-Fi connection, an ultra-high frequency (UHF) connection, and a very high frequency (VHF) connection.

In an embodiment, the mobile microphone 10 may be connected to the receiver 20 through wired communication. The wired communication connection may include a cable connection. Specifically, the cable connection may include a connection through a microphone cable. The microphone cable may be a coaxial cable.

For the mobile microphone 10 that uses the VHF connection or the UHF connection, a frequency of the mobile microphone 10 may be adjusted to a frequency range that can be received by the receiver 20, so that the mobile microphone 10 and the receiver 20 are communicatively connected and may be directly used. For the mobile microphone 10 that uses the Wi-Fi connection or the Bluetooth connection, a power supply of the mobile microphone 10 may be turned on, and the mobile microphone 10 may perform Wi-Fi pairing or Bluetooth pairing with the receiver 20, to implement the communication connection.

In a case that the mobile microphone 10 and the receiver 20 are connected through wireless communication, the receiver 20 may be a universal serial bus (USB) receiver, and the receiver 20 may be inserted into a USB interface on the multimedia host 30. The receiver 20 may also be fixed on the multimedia host 30 as a module that is of the multimedia host 30 and that has a wireless communication function. Specifically, the USB receiver may be a USB dongle receiver.

In a case that the mobile microphone 10 and the receiver 20 are connected through wired communication, the receiver 20 may be an audio input hole fixed on the multimedia host 30. One end of a cable may be inserted into the audio input hole, and another end of the cable may be inserted into an audio output hole on the mobile microphone 10.

The mobile microphone 10 may convert a sound signal transmitted by the user into a voice signal, where the voice signal is an electrical signal. The mobile microphone may be integrated with a positioning module to implement a positioning function. For example, whether the mobile microphone is in inside or outside a vehicle may be determined.

The multimedia host 30 may be embedded with a software development kit (SDK) and define a corresponding all-scenario policy. The SDK may include computer program code, and the multimedia host 30 runs the computer program code and may implement some or all steps in a vehicle-mounted audio playing method below.

The multimedia host 30 may run a multimedia system, and a third-party karaoke APP may be run on the multimedia system. The multimedia system may further have a karaoke applet. When the user opens the third-party karaoke APP, the karaoke applet may automatically pop up, so that the user may sing karaoke in the vehicle. The karaoke applet is equivalent to a sound mixing console, and the user may adjust a system volume and a sound effect of the multimedia system through an in-vehicle display (for example, a PAD). The karaoke applet is an applet of the multimedia system, and may be implanted by a developer of the multimedia system.

The multimedia host 30 may obtain, through the receiver 20, a voice signal collected by the mobile microphone 10, and may process the voice signal. The processed signal may be amplified through the power amplifier 40 and then outputted to the out-of-vehicle speaker 60, to drive the out-of-vehicle speaker 60 to produce sound.

The power amplifier 40 is briefly referred to as a PA and is a basic device in a stereo system. The power amplifier is responsible for amplifying a weak signal from a signal source (the voice signal collected by the mobile microphone 10) or previous processing, to drive a speaker to produce sound.

The multimedia host 30 may be connected to an A2B module of the power amplifier 40 through a A2B bus in a signal connection manner.

The out-of-vehicle speaker 60 is a speaker mounted outside the vehicle and is generally used for alerting. The out-of-vehicle speaker 60 in the embodiments of the present disclosure may be used for alerting, and may be further used in multiple scenarios such as karaoke, giving a lecture, hosting, and the like.

Specifically, the out-of-vehicle speaker 60 may be a speaker in an out-of-vehicle acoustic vehicle alerting system (AVAS). The out-of-vehicle AVAS is generally used for alerting. For example, when someone hits, bumps, or moves a vehicle, a sensor sends a signal to a controller to indicate intensity of shock. The controller may make a warning sound or alarm according to the intensity of shock, to frighten a thief, and prompt and notify an owner.

In this embodiment of the present disclosure, the speaker in the out-of-vehicle AVAS may be used as a stereo, so that out-of-vehicle karaoke may be implemented based on the out-of-vehicle AVAS, thereby resolving a problem of low sound and poor user experience during out-of-vehicle karaoke.

Generally, a speaker of an existing out-of-vehicle AVAS has a maximum power of about 5 W and a rated power of 4 W, and there is a gap with a professional stereo in terms of karaoke experience. To bridge the power gap, a maximum power of the out-of-vehicle speaker (the speaker in the out-of-vehicle AVAS) in this embodiment of the present disclosure may be set to greater than 10 W. Frequency response is used in electronics to describe a difference in capabilities of an instrument to process signals of different frequencies. Frequency response refers to a change curve of a gain with a frequency. Any stereo equipment or carrier (an object that records a sound signal) has a frequency response curve. An ideal frequency response curve should be straight, and there may be no distortion after the sound signal passes through. However, a current frequency response curve of the out-of-vehicle AVAS cannot meet user's multi-scenario requirements. Therefore, in the present disclosure, an out-of-vehicle AVAS with a high power (for example, an out-of-vehicle AVAS with a power greater than 10 W) may be used, and frequency response and other parameters of the out-of-vehicle AVAS are debugged and optimized to make a frequency response curve meet karaoke requirements. For example, after the frequency response of the out-of-vehicle AVAS is debugged and optimized, the frequency response changes relatively slightly with the frequency, and fluctuation is less than a fluctuation threshold, that is, there may be no sudden rise or drop. In this way, in addition to producing a low-speed alarm sound (where the vehicle may produce certain decibel electronic sound when driving at a low speed to warn a passing vehicle and a pedestrian to be careful), the out-of-vehicle AVAS in the present disclosure may also use the speaker to implement functions such as singing karaoke, playing music, and the like. In this embodiment of the present disclosure, functions of the speaker of the out-of-vehicle AVAS may be fully used, to improve an effect and user's experience of out-of-vehicle karaoke, and meet user's multi-scenario requirements.

Figure 1B:
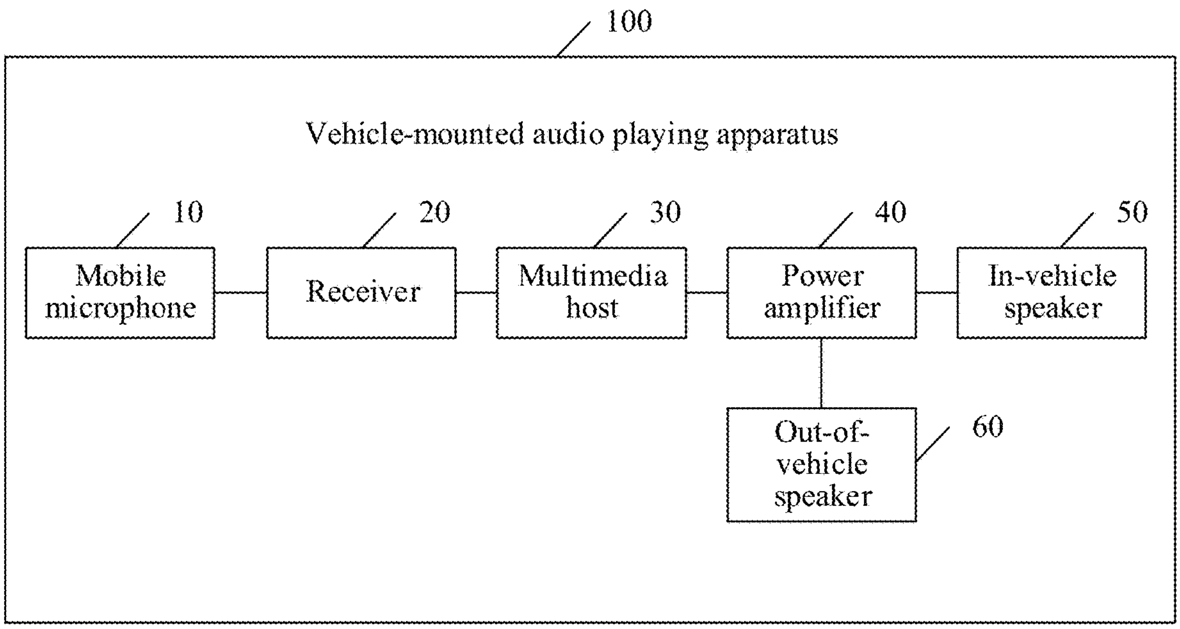
FIG. 1B is a schematic structural diagram of a vehicle-mounted audio playing apparatus according to another embodiment of the present disclosure.

Referring to FIG. 1B, FIG. 1B is a schematic structural diagram of a vehicle-mounted audio playing apparatus according to an embodiment of the present disclosure. As shown in FIG. 1B, the vehicle-mounted audio playing apparatus 100 may further include an in-vehicle speaker 50. As the name implies, the in-vehicle speaker 50 is a speaker mounted inside the vehicle, and is generally configured to play broadcast and music, perform voice navigation, and the like. The in-vehicle speaker 50 may be used in a scenario of in-vehicle karaoke and in-vehicle lecture.

Figure 2:
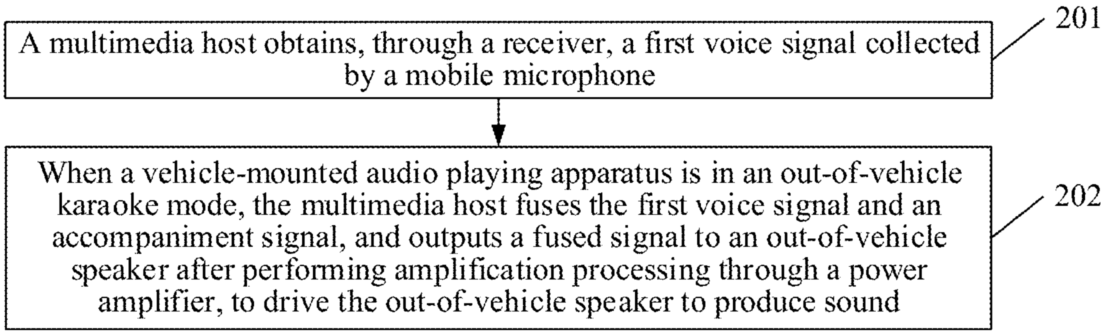
FIG. 2 is a schematic flowchart of a vehicle-mounted audio playing method according to an embodiment of the present disclosure.

Referring to FIG. 2, FIG. 2 is a schematic flowchart of a vehicle-mounted audio playing method according to an embodiment of the present disclosure. The method shown in FIG. 2 may be applied to the vehicle-mounted audio playing apparatus shown in FIG. 1A or FIG. 1B. As shown in FIG. 2, the vehicle-mounted audio playing method may include the following steps:

Step 201: A multimedia host obtains, through a receiver, a first voice signal collected by a mobile microphone.

In this embodiment of the present disclosure, after the receiver is successfully paired with the mobile microphone, the receiver may receive a voice signal from the mobile microphone, and the multimedia host obtains the voice signal from the receiver.

If the receiver is a general USB receiver, before step 201 is performed, the receiver may be inserted into a USB interface on the multimedia host, and the mobile microphone is turned on, to enable the receiver to pair with the mobile microphone. In this case, the user may make detection voice to detect whether the mobile microphone can transmit the collected voice signal to the multimedia host.

Step 202: When a vehicle-mounted audio playing apparatus is in an out-of-vehicle karaoke mode, the multimedia host fuses the first voice signal and an accompaniment signal, and output a fused signal to an out-of-vehicle speaker after performing amplification through a power amplifier, to drive the out-of-vehicle speaker to produce sound.

In an embodiment, the method shown in FIG. 2 may be applied to the vehicle-mounted audio playing apparatus shown in FIG. 1B. The fused signal may be further amplified through the power amplifier and then outputted to an in-vehicle speaker, to drive the in-vehicle speaker to produce sound. The fused signal is amplified through the power amplifier, and then may be simultaneously outputted to the out-of-vehicle speaker and the in-vehicle speaker, which can simultaneously drive the out-of-vehicle speaker and the in-vehicle speaker to produce sound, and further improve a karaoke effect.

In this embodiment of the present disclosure, the accompaniment signal is a signal corresponding to instrumental music accompanying singing or a signal corresponding to background music, which may be obtained by loading through, for example, a third-party karaoke APP. The karaoke mode is a mode in which the user sings through a Karaoke TV. In the out-of-vehicle karaoke mode, the user may sing karaoke inside or outside the vehicle, and the out-of-vehicle speaker produces sound, which can improve an effect and user's experience of out-of-vehicle karaoke, and meet user's multi-scenario requirements.

Specifically, the user may open the third-party karaoke APP. In this case, the third-party karaoke APP may call a karaoke applet of the multimedia system, and the karaoke applet automatically pops up. The user sets a karaoke mode as an "out-of-vehicle karaoke mode" on a display interface of the PAD, and selects a favorite song through the third-party karaoke APP to play, and sings karaoke with the favorite song.

For a specific song, if the third-party karaoke APP supports singing of the song, the karaoke applet may set a sound effect mode and adjust reverberation strength, and sound effect adjustment and audio mixing adjustment are performed on a user's voice signal collected by the mobile microphone and accompaniment of the song, thereby achieving a better karaoke effect. If the third-party karaoke APP does not support singing of the song, the third-party karaoke APP may also play the song, but the karaoke applet cannot set the sound effect and adjust reverberation. The karaoke user may still hum through the mobile microphone, but the karaoke effect is slightly poor than that of audio mixing. However, the out-of-vehicle speaker may also simultaneously produce vocal and accompaniment sound.

The multimedia system may set a whitelist for karaoke software. When recognizing that the karaoke software in the whitelist is opened, the multimedia system may call the karaoke applet and singing karaoke normally.

In the out-of-vehicle karaoke mode, the user may hold the mobile microphone to sing karaoke in the vehicle, or may hold the mobile microphone to sing karaoke outside the vehicle. In the out-of-vehicle karaoke mode, when the user holds the mobile microphone to sing karaoke in the vehicle, the multimedia host fuses the first voice signal and the accompaniment signal. A fused signal drives, through the power amplifier, the out-of-vehicle speaker and the in-vehicle speaker to produce sound. In this case, the out-of-vehicle speaker and the in-vehicle speaker may synchronously produce sound. In the out-of-vehicle karaoke mode, when the user holds the mobile microphone to sing karaoke outside the vehicle, the multimedia host fuses the first voice signal and the accompaniment signal, and outputs a fused signal to the out-of-vehicle speaker and the in-vehicle speaker after performing processing through the power amplifier to drive the out-of-vehicle speaker and the in-vehicle speaker to produce sound, or outputs a fused signal to the out-of-vehicle speaker after performing amplification through the power amplifier to drive the out-of-vehicle speaker to produce sound.

In the out-of-vehicle karaoke mode, the out-of-vehicle speaker is definitely used, and the user may also determine, according to preferences, whether to turn on the in-vehicle speaker. For example, if the user wants sound of karaoke to be as loud as possible, both the in-vehicle speaker and the out-of-vehicle speaker may be on (for example, when the out-of-vehicle karaoke mode is selected, the user may continue to select whether to turn on both the in-vehicle speaker and the out-of-vehicle speaker, where if yes, both the out-of-vehicle speaker and the in-vehicle speaker are turned on; and if no, only the out-of-vehicle speaker is turned on). For example, when the user does not want sound of karaoke to be too loud, the user may choose to turn on only the out-of-vehicle speaker. In the out-of-vehicle karaoke mode, karaoke requirements of different users may be met, thereby meeting user's multi-scenario requirements.

Optionally, in step 202, the multimedia host fuses the first voice signal and the accompaniment signal, which may specifically include the following steps:

(11) The multimedia host performs audio mixing processing on the first voice signal and the accompaniment signal.

(12) The multimedia host performs tuning processing on the first voice signal and the accompaniment signal, and performs audio mixing processing on the first voice signal on which audio mixing processing is performed and the accompaniment signal on which audio mixing processing is performed.

In this embodiment of the present disclosure, audio mixing processing may adjust two or more audio signals individually according to a frequency, dynamics, sound quality, positioning, reverberation, and a sound field to optimize each audio signal, and then the signals are superposed. The mixing processing manner may achieve a distinct effect, thereby improving the karaoke effect. Tuning processing may be equalizer (EQ) tuning.

Specifically, EQ tuning may adjust sound effect EQ in the in-vehicle karaoke system at different positions. EQ tuning for karaoke users sitting in a main driver seat, a co-pilot seat, and a rear seat are different. For example, if the karaoke user sits in the main driver seat and sings karaoke in the main driver seat, the effect may be very good. However, if the karaoke user sits in the co-pilot seat or in the rear seat, the effect may be worse. In this case, tuning processing may be performed, so that a tuned sound effects not only provide better experience for a main driver, but also provide a better sound effect for a co-driver and a rear-seat user when singing karaoke. Tuning generally requires two, three or more rounds of tuning to achieve a relatively good effect. Tuning processing may be performed according to EQ parameters finally adjusted through EQ tuning.

When a requirement for the sound effect is not high, tuning is not required; or when a requirement for the sound effect is high, tuning is required. The multimedia host performs tuning processing on the first voice signal by using pre-adjusted voice tuning parameters, and performs tuning processing on the accompaniment signal by using pre-adjusted accompaniment tuning parameters. For example, a ratio between a microphone volume and accompaniment music is adjusted, and tone of the accompaniment music is adjusted. The voice tuning parameters and the accompaniment tuning parameters may be preset. In this way, tuning processing may be directly performed according to preset parameters, to avoid a relatively high delay caused by directly adding a sound effect, and improve a delay due to tuning during karaoke, thereby improving a user's karaoke effect and experience.

Figure 3:
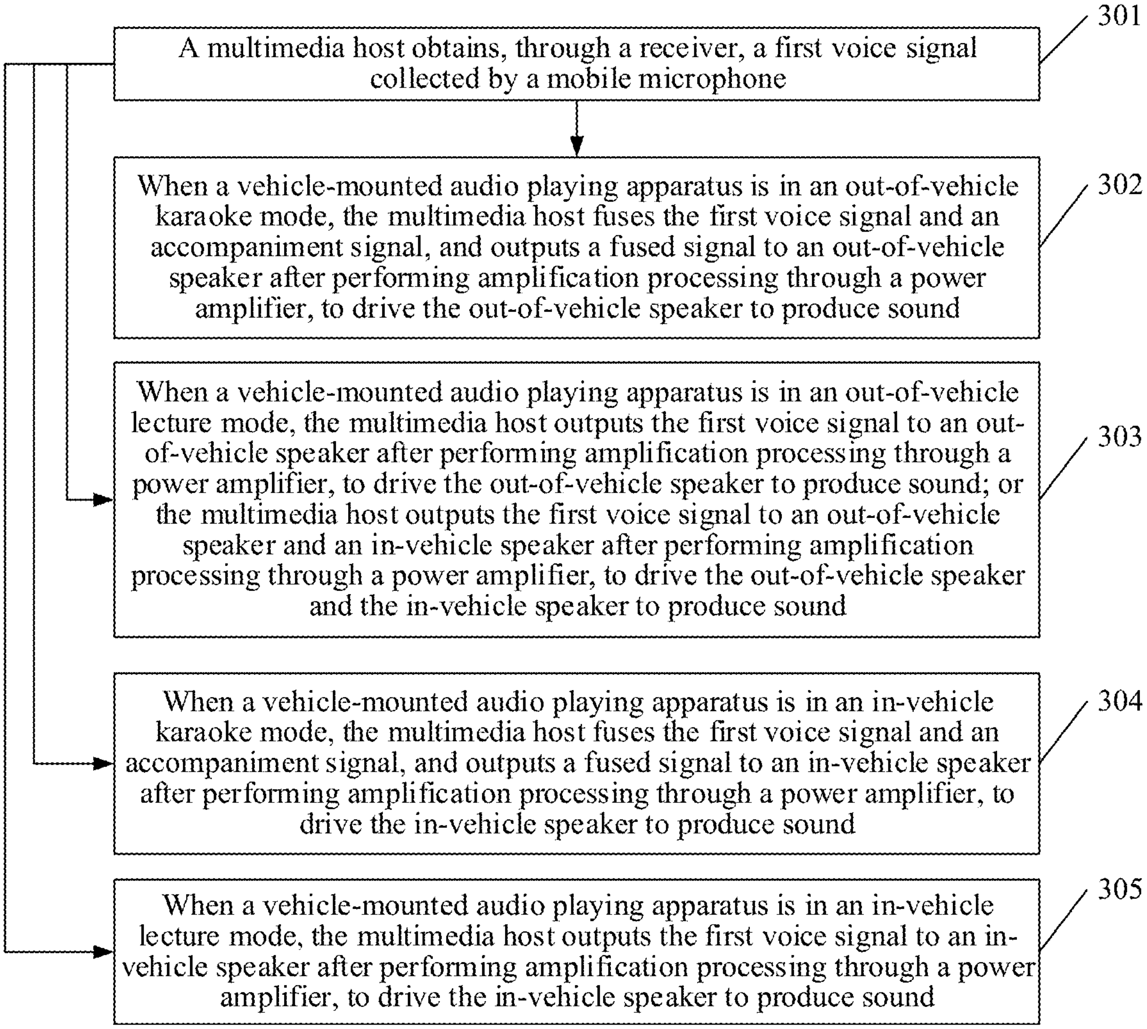
FIG. 3 is a schematic flowchart of a vehicle-mounted audio playing method according to another embodiment of the present disclosure.

Referring to FIG. 3, FIG. 3 is a schematic flowchart of a vehicle-mounted audio playing method according to another embodiment of the present disclosure. The method shown in FIG. 3 may be applied to the vehicle-mounted audio playing apparatus shown in FIG. 1A or FIG. 1B. As shown in FIG. 3, the vehicle-mounted audio playing method may include the following steps:

Step 301: A multimedia host obtains, through a receiver, a first voice signal collected by a mobile microphone.

Step 302: When a vehicle-mounted audio playing apparatus is in an out-of-vehicle karaoke mode, the multimedia host fuses the first voice signal and an accompaniment signal, and output a fused signal to an out-of-vehicle speaker after performing amplification through a power amplifier, to drive the out-of-vehicle speaker to produce sound.

Optionally, the vehicle-mounted audio playing apparatus may further include a display screen (referring to FIG. 4) and a projector. In the out-of-vehicle karaoke mode, content displayed on the display screen may be holographically projected outside the vehicle through the projector. In an environment outside the vehicle, holographic projection may provide a better sense of user immersion for the karaoke user, thereby improving the user's karaoke effect and experience outside the vehicle.

For specific implementations of step 301 and step 302, refer to step 201 and step 202 shown in FIG. 2. Details are not described herein again.

Step 303: When the vehicle-mounted audio playing apparatus is in an out-of-vehicle lecture mode, the multimedia host outputs the first voice signal to the out-of-vehicle speaker after performing amplification processing through the power amplifier, to drive the out-of-vehicle speaker to produce sound; or the multimedia host outputs the first voice signal to the out-of-vehicle speaker and the in-vehicle speaker after performing amplification processing through the power amplifier, to drive the out-of-vehicle speaker and the in-vehicle speaker to produce sound.

In this embodiment of the present disclosure, the lecture mode is a mode that requires the use of a speaker to produce sound but does not require accompaniment. The user sets a microphone mode to an "out-of-vehicle lecture mode" on a display interface. In the out-of-vehicle lecture mode, the user does not need to open a third-party karaoke APP on a multimedia system, and a karaoke applet may not pop up. The multimedia host outputs the first voice signal to the out-of-vehicle speaker after performing amplification processing through the power amplifier, to drive the out-of-vehicle speaker to produce sound, or outputs the first voice signal to the out-of-vehicle speaker and the in-vehicle speaker after performing amplification processing through the power amplifier, to drive the out-of-vehicle speaker and the in-vehicle speaker to produce sound. In this embodiment of the present disclosure, the mobile microphone can also be used without opening the third-party karaoke APP, which is not limited to an indoor karaoke scenario in which the third-party karaoke APP is opened, and the mobile microphone may be used in more scenarios, to meet the user's multi-scenario use requirements.

In the out-of-vehicle lecture mode, the out-of-vehicle speaker is definitely used, and the user may also determine, according to preferences, whether to turn on the in-vehicle speaker. For example, if the user wants sound of an out-of-vehicle lecture to be as loud as possible, both the in-vehicle speaker and the out-of-vehicle speaker may be turned on (for example, when the out-of-vehicle lecture mode is selected, the user may continue to select whether to turn on both the in-vehicle speaker and the out-of-vehicle speaker, where if yes, both the out-of-vehicle speaker and the in-vehicle speaker are turned on; and if no, only the out-of-vehicle speaker is turned on). For example, when the user does not want sound of an out-of-vehicle lecture to be too loud, the user may choose to turn on only the out-of-vehicle speaker.

In the out-of-vehicle lecture mode, the user may collect voice through the mobile microphone and produce sound through the out-of-vehicle speaker, to meet user's requirements in scenarios such as giving a lecture, hosting, and voice sales outside the vehicle, thereby meeting the user's multi-scenario use requirements.

Step 304: When the vehicle-mounted audio playing apparatus is in an in-vehicle karaoke mode, the multimedia host fuses the first voice signal and the accompaniment signal, and outputs a fused signal to the in-vehicle speaker after performing amplification processing through the power amplifier, to drive the in-vehicle speaker to produce sound.

In this embodiment of the present disclosure, the in-vehicle karaoke mode is one of karaoke modes that can be selected. In the in-vehicle karaoke mode, the user may sing karaoke in the vehicle, and the in-vehicle speaker produces sound, which can improve user's experience of in-vehicle karaoke, and meet user's multi-scenario requirements.

Specifically, the user may open the third-party karaoke APP. In this case, the third-party karaoke APP may call the karaoke applet of the multimedia system, and the karaoke applet automatically pops up. The user sets a karaoke mode to an "in-vehicle karaoke mode" on a display interface, and selects a favorite song through the third-party karaoke APP to play, thereby implementing in-vehicle karaoke singing.

For a specific song, if the third-party karaoke APP supports singing of the song, the karaoke applet may set a sound effect mode and adjust reverberation strength according to user's sound preferences, and sound effect adjustment and audio mixing adjustment are performed on a user's voice signal collected by the mobile microphone and accompaniment of the song, thereby achieving a better karaoke effect. If the third-party karaoke APP does not support singing of the song, the third-party karaoke APP may also play the song, but the karaoke applet cannot set the sound effect and adjust reverberation. The karaoke user may still hum through the mobile microphone, but the karaoke effect is slightly poor than that of audio mixing. However, the in-vehicle speaker may also simultaneously produce vocal and accompaniment sound.

The multimedia system may set a whitelist for karaoke software. When recognizing that the karaoke software in the whitelist is opened, the multimedia system may call the karaoke applet and singing karaoke normally.

In the in-vehicle karaoke mode, the user may hold the mobile microphone to sing karaoke in the vehicle. When the user holds the mobile microphone to sing karaoke in the vehicle, the multimedia host fuses the first voice signal and the accompaniment signal. A fused signal drives, through the power amplifier, the in-vehicle speaker to produce sound.

Optionally, in step 304, the multimedia host fuses the first voice signal and the accompaniment signal, which may specifically include the following steps:

(21) The multimedia host performs audio mixing processing on the first voice signal and the accompaniment signal.

(22) The multimedia host performs tuning processing on the first voice signal and the accompaniment signal, and performs audio mixing processing on the first voice signal on which audio mixing processing is performed and the accompaniment signal on which audio mixing processing is performed.

For specific implementations of step (21) and step (22), refer to step (11) and step (12). Details are not described herein again.

Step 305: When the vehicle-mounted audio playing apparatus is in an in-vehicle lecture mode, the multimedia host outputs the first voice signal to the in-vehicle speaker after performing amplification processing through the power amplifier, to drive the in-vehicle speaker to produce sound.

In this embodiment of the present disclosure, the user sets a microphone mode to an "in-vehicle lecture mode" on a display interface. In the in-vehicle lecture mode, the user does not need to open a third-party karaoke APP on a multimedia system, and a karaoke applet may not pop up. The multimedia host outputs the first voice signal to the in-vehicle speaker after performing amplification processing through the power amplifier, to drive the in-vehicle speaker to produce sound.

In the in-vehicle lecture mode, the user may produce sound through the in-vehicle speaker, to meet user's requirements in scenarios such as giving a lecture, hosting, and voice sales in the vehicle, thereby meeting the user's multi-scenario use requirements.

In this embodiment of the present disclosure, according to user's own requirements, the user may set any one of an "out-of-vehicle karaoke mode", an "in-vehicle karaoke mode", an "out-of-vehicle lecture mode", and an "in-vehicle lecture mode" on the display interface, to meet the user's multi-scenario use requirements.

Figure 4:
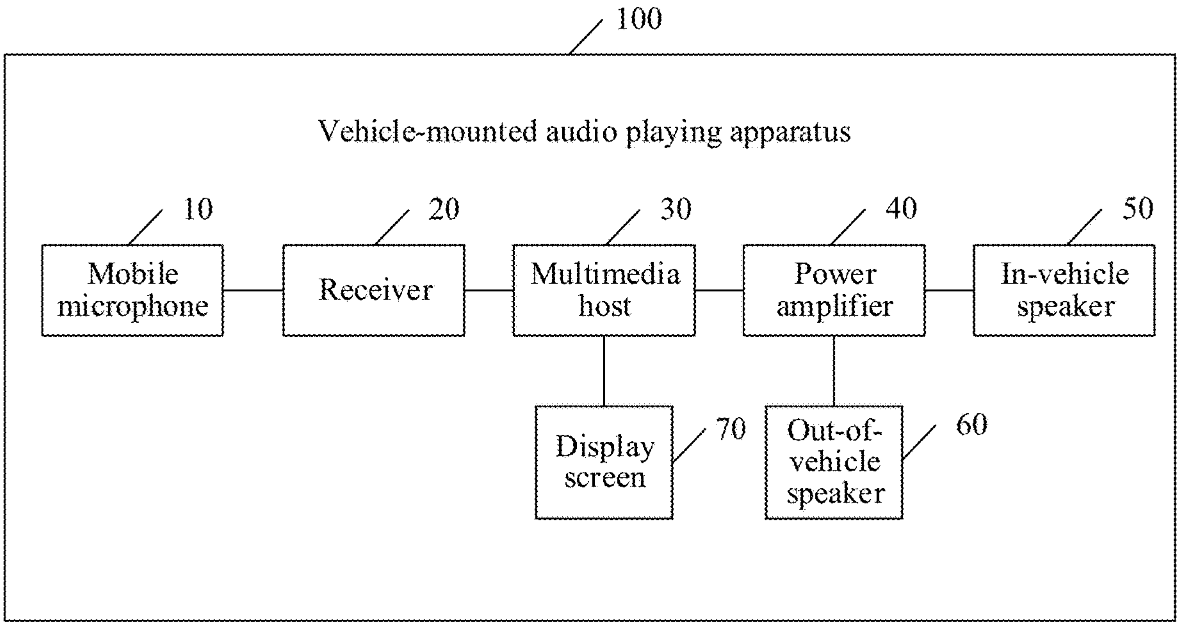
FIG. 4 is a schematic structural diagram of a vehicle-mounted audio playing apparatus according to another embodiment of the present disclosure.

Referring to FIG. 4, FIG. 4 is a schematic structural diagram of a vehicle-mounted audio playing apparatus according to still another embodiment of the present disclosure. FIG. 4 is another variant structure based on FIG. 1B. As shown in FIG. 4, the vehicle-mounted audio playing apparatus may further include a display screen 70.

The multimedia host 30 is configured to receive, through the display screen 70, a mode selection instruction inputted by a user, to select the out-of-vehicle karaoke mode.

A display interface of the display screen 70 may display a mode selection menu, and is configured to click/tap the mode selection menu to enter a mode selection interface. The mode selection interface may display the "out-of-vehicle karaoke mode", the "in-vehicle karaoke mode", the "out-of-vehicle lecture mode", and the "in-vehicle lecture mode", and the user may select any one of the modes. When the user opens the third-party karaoke APP, the mode selection interface may display the "out-of-vehicle karaoke mode" and the "in-vehicle karaoke mode". When the user closes the third-party karaoke APP, the mode selection interface may display the "out-of-vehicle karaoke mode", the "in-vehicle karaoke mode", the "out-of-vehicle lecture mode", and the "in-vehicle lecture mode".

Figure 5:
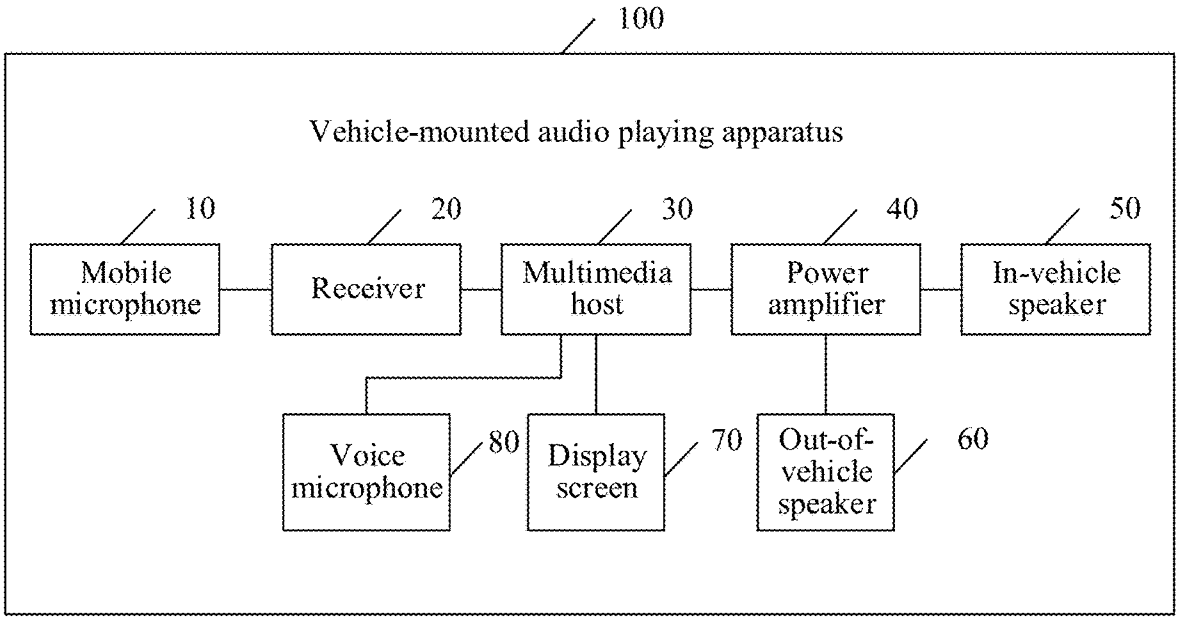
FIG. 5 is a schematic structural diagram of a vehicle-mounted audio playing apparatus according to still another embodiment of the present disclosure.

Referring to FIG. 5, FIG. 5 is a schematic structural diagram of a vehicle-mounted audio playing apparatus according to still another embodiment of the present disclosure. FIG. 5 is further optimized based on FIG. 4. As shown in FIG. 5, the vehicle-mounted audio playing apparatus 100 may further include a voice microphone 80.

The multimedia host 30 is configured to set the voice microphone 80 as a prime focus when the vehicle-mounted audio playing apparatus is in an intelligent voice mode or a Bluetooth phone mode. When the voice microphone 80 is set as the prime focus, voice collected by the voice microphone 80 is allowed to produce sound through a speaker, and voice collected by the mobile microphone 10 is prohibited from producing sound through a speaker.

The multimedia host 30 is configured to set the mobile microphone 10 as a prime focus in the out-of-vehicle karaoke mode. When the mobile microphone 10 is set as the prime focus, voice collected by the mobile microphone 10 is allowed to produce sound through the speaker, and voice collected by the voice microphone 80 is prohibited from producing sound through the speaker.

In this embodiment of the present disclosure, the intelligent voice mode is a mode activated in response to a voice command containing specific voice. In the intelligent voice mode, the user may intelligently interact with the system by issuing the voice command containing specific voice. The Bluetooth phone mode is a mode in which a terminal such as a mobile phone make calls through Bluetooth. The prime focus may be understood as a main point of concern. When the voice microphone 80 is the prime focus, the multimedia system may allow voice collected by the voice microphone 80 to produce sound through a speaker (at least one of the in-vehicle speaker and the out-of-vehicle speaker), and prohibit voice collected by the mobile microphone 10 from producing sound through a speaker. When the mobile microphone 10 is the prime focus, the multimedia system may allow voice collected by the mobile microphone 10 to produce sound through a speaker (at least one of the in-vehicle speaker and the out-of-vehicle speaker), and prohibit voice collected by the voice microphone 80 from producing sound through a speaker. In this embodiment of the present disclosure, the voice microphone 80 or the mobile microphone 10 may be set as the prime focus according to different modes, to prevent the voice microphone 80 and the mobile microphone from simultaneously producing sound, thereby preventing the voice microphone 80 and the mobile microphone 10 from interfering with each other.

The vehicle-mounted audio playing apparatus 100 may include at least one voice microphone 80. When the vehicle-mounted audio playing apparatus 100 includes two voice microphones, one voice microphone may be configured to collect a first signal (including user's voice and surrounding environment sound), and another voice microphone is configured to collect a second signal (that is, surrounding environment sound), to further obtain a noise-reduced user voice signal in combination with the first signal and the second signal, thereby achieving noise reduction based on dual microphones and improving a voice noise reduction effect. The vehicle-mounted audio playing apparatus 100 may also include at least one mobile microphone 10. When at least two mobile microphones 10 are included, multiple people can simultaneously sing karaoke.

Generally, the voice microphone 80 and the mobile microphone 10 cannot simultaneously drive a speaker to produce sound. In some cases, the voice microphone 80 and the mobile microphone 10 may simultaneously collect voice, and the multimedia system may determine, according to voice collected by the voice microphone 80, whether to enter the intelligent voice mode or the Bluetooth phone mode.

The intelligent voice mode or the Bluetooth phone mode may be set in the multimedia system, or may be automatically triggered to enter. For example, when it is recognized that voice collected by the voice microphone 80 contains a specific voice command, the intelligent voice mode is automatically entered, and the voice microphone 80 is set as the prime focus. The specific voice command may be pre-set, for example, the command may be set to include "Name A", "Name B", "Name C", and the like. When the user issues the specific voice command, the intelligent voice mode is automatically entered. The voice microphone 80 collects user's voice for intelligent voice interaction with the multimedia host 30 (for example, Name A, turn on an air conditioner; in another example, Name A, navigate to XX Building, etc.).

In another example, when the mobile phone is connected to the multimedia host 30 through Bluetooth, if the mobile phone receives a call, the multimedia host 30 automatically enters the Bluetooth phone mode, and the multimedia host 30 sets the voice microphone 80 as the prime focus. In this case, call information may be displayed on a display screen corresponding to the multimedia host 30, the user taps the display screen to answer the call, that is, a Bluetooth call is performed through the multimedia host 30, user's voice is collected by the voice microphone 80, and caller's voice is emitted through the in-vehicle speaker.

The voice microphone 80 may be connected to the multimedia host 30 through a microphone interface.

Figure 6:
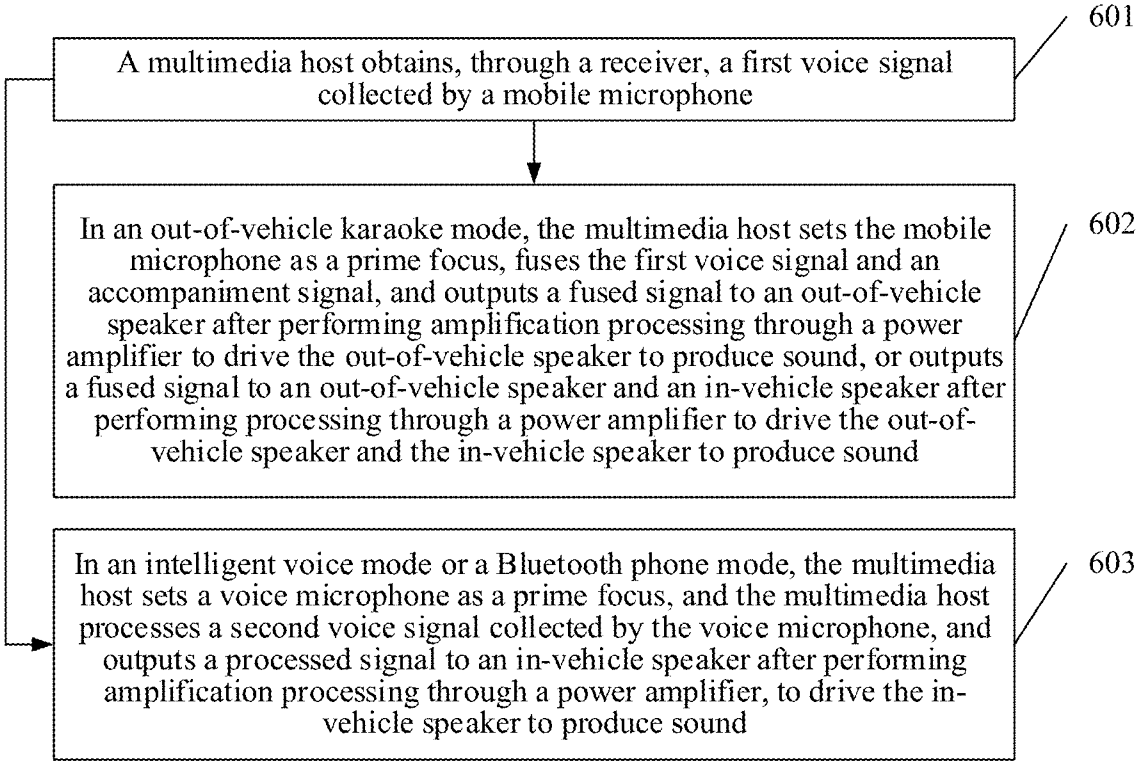
FIG. 6 is a schematic flowchart of a vehicle-mounted audio playing method according to still yet another embodiment of the present disclosure.

Referring to FIG. 6, FIG. 6 is a schematic flowchart of a vehicle-mounted audio playing method according to another embodiment of the present disclosure. The method shown in FIG. 6 may be applied to the vehicle-mounted audio playing apparatus shown in FIG. 1A. As shown in FIG. 6, the vehicle-mounted audio playing method may include the following steps:

Step 601: A multimedia host obtains, through a receiver, a first voice signal collected by a mobile microphone.

For specific implementations of step 601, refer to step 201 shown in FIG. 2. Details are not described herein again.

Step 602: In the out-of-vehicle karaoke mode, the multimedia host sets the mobile microphone as the prime focus, fuses the first voice signal and an accompaniment signal, and outputs a fused signal to the out-of-vehicle speaker after performing amplification processing through a power amplifier to drive the out-of-vehicle speaker to produce sound, or outputs a fused signal to the out-of-vehicle speaker and the in-vehicle speaker after performing amplification processing through a power amplifier to drive the out-of-vehicle speaker and the in-vehicle speaker to produce sound.

In this embodiment of the present disclosure, in step 602, that in an out-of-vehicle karaoke mode, the multimedia host sets the mobile microphone as a prime focus may be performed before step 601.

Optionally, the method shown in FIG. 6 may further include the following steps:

- in the in-vehicle karaoke mode, setting, by the multimedia host, the mobile microphone as the prime focus;
- in the out-of-vehicle lecture mode, setting, by the multimedia host, the mobile microphone as the prime focus; and
- in the in-vehicle lecture mode setting, by the multimedia host, the mobile microphone as the prime focus.

The multimedia host sets the mobile microphone as the prime focus provided that the vehicle-mounted audio playing apparatus is in any one of the "out-of-vehicle karaoke mode", the "in-vehicle karaoke mode", the "out-of-vehicle lecture mode", or the "in-vehicle lecture mode".

Step 603: In the intelligent voice mode or the Bluetooth phone mode, the multimedia host sets the voice microphone as the prime focus, and the multimedia host processes a second voice signal collected by the voice microphone, and outputs a processed signal to the in-vehicle speaker after performing amplification processing through the power amplifier, to drive the in-vehicle speaker to produce sound.

In this embodiment of the present disclosure, the voice microphone or the mobile microphone may be set as the prime focus according to different modes, to prevent the voice microphone and the mobile microphone from simultaneously producing sound, thereby preventing the voice microphone and the mobile microphone from interfering with each other.

Optionally, a priority of the intelligent voice mode is higher than a priority of the out-of-vehicle karaoke mode, and a priority of the Bluetooth phone mode is higher than the priority of the out-of-vehicle karaoke mode.

In this embodiment of the present disclosure, priorities of different modes may be set. When there is a conflict between two modes, a mode with a higher priority may be selected to be preferentially entered, thereby improving user experience.

The priority of the intelligent voice mode is higher than a priority of any one of the "out-of-vehicle karaoke mode", the "in-vehicle karaoke mode", "out-of-vehicle lecture mode", and the "in-vehicle lecture mode".

Optionally, the priority of the Bluetooth phone mode is higher than the priority of the intelligent voice mode.

In this embodiment of the present disclosure, the priority of the Bluetooth phone mode may be set to higher than the priority of the intelligent voice mode, which can ensure call experience of a Bluetooth call and prevent the Bluetooth call from being interrupted by intelligent voice.

The solutions of the embodiments of the present disclosure are mainly described above from a perspective of an execution process of the method. It may be understood that, to implement the foregoing functions, the multimedia host includes corresponding hardware structures and/or software modules for performing the functions. A person skilled in the art should be easily aware that, in combination with the units and algorithm steps of the examples described in the embodiments provided in the present disclosure, the present disclosure can be implemented by hardware or a combination of hardware and computer software. Whether a function is performed by hardware or computer software driving hardware depends on particular applications and design constraints of the technical solutions. A person skilled in the art may use different methods to implement the described functions for each particular application, but it should not be considered that the implementation goes beyond the scope of the present disclosure.

In the embodiments of the present disclosure, functional units of the multimedia host may be divided according to the foregoing method examples. For example, the functional units may be divided according to corresponding functions, or two or more functions may be integrated into one processing unit. The integrated unit may be implemented in a form of hardware, or may be implemented in a form of a software function unit. It is to be noted that, in this embodiment of the present disclosure, the unit division is an example, and is merely logical function division, and there may be other division manners during actual application.

Figure 7:
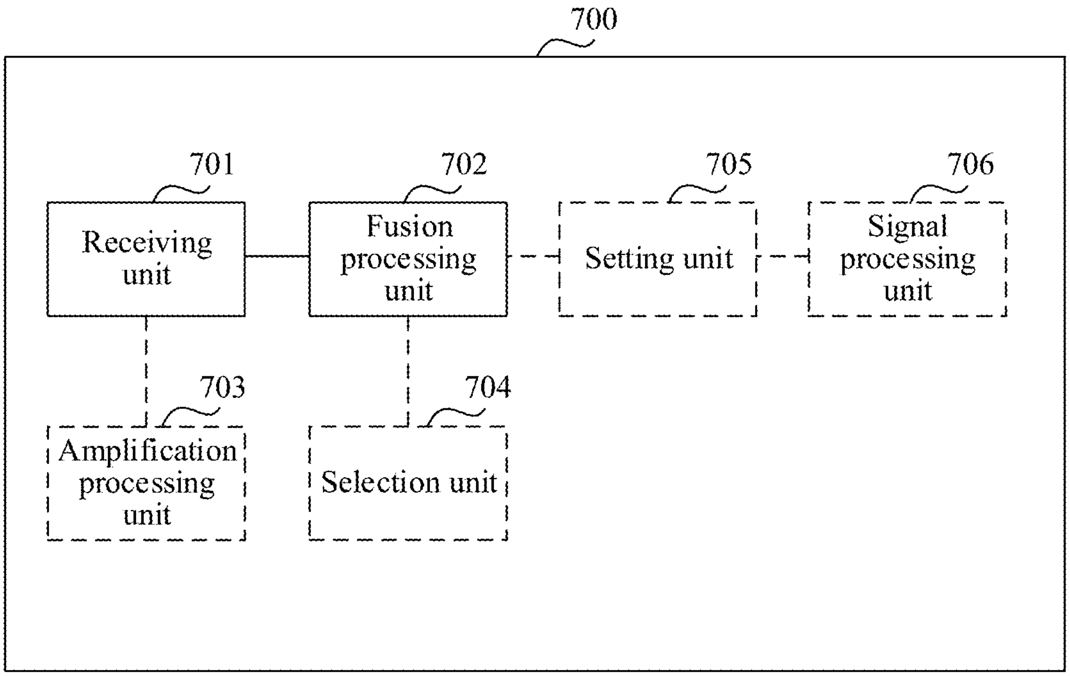
FIG. 7 is a schematic structural diagram of a multimedia host according to an embodiment of the present disclosure.

Consistent with the above, referring to FIG. 7, FIG. 7 is a schematic structural diagram of a multimedia host according to an embodiment of the present disclosure. The multimedia host 700 may include a receiving unit 701 and a fusion processing unit 702.

The receiving unit 701 is configured to obtain, through a receiver, a first voice signal collected by a mobile microphone.

The fusion processing unit 702 is further configured to: in an out-of-vehicle karaoke mode, fuse the first voice signal and an accompaniment signal, and output a fused signal to an out-of-vehicle speaker after performing amplification processing through a power amplifier, to drive the out-of-vehicle speaker to produce sound.

Optionally, the fused signal is further amplified through the power amplifier and then outputted to an in-vehicle speaker, to drive the in-vehicle speaker to produce sound.

Optionally, the multimedia host 700 may further include an amplification processing unit 703.

The amplification processing unit 703 is configured to: in an out-of-vehicle lecture mode, output the first voice signal to the out-of-vehicle speaker after performing amplification processing through the power amplifier, to drive the out-of-vehicle speaker to produce sound, or outputting the first voice signal to the out-of-vehicle speaker and the in-vehicle speaker after performing amplification processing through the power amplifier, to drive the out-of-vehicle speaker and the in-vehicle speaker to produce sound.

Optionally, the fusion processing unit 702 is further configured to: in an in-vehicle karaoke mode, fuse the first voice signal and an accompaniment signal, and output a fused signal to an in-vehicle speaker after performing amplification processing through the power amplifier, to drive the in-vehicle speaker to produce sound.

The amplification processing unit 703 is further configured to: in an in-vehicle lecture mode, output the first voice signal to the in-vehicle speaker after performing through the power amplifier, to drive the in-vehicle speaker to produce sound.

Optionally, that the fusion processing unit 702 fuses the first voice signal and the accompaniment signal includes:

performing audio mixing processing on the first voice signal and the accompaniment signal; or performing tuning processing on the first voice signal and the accompaniment signal, and performing audio mixing processing on the first voice signal on which audio mixing processing is performed and the accompaniment signal on which audio mixing processing is performed.

Optionally, the multimedia host 700 may further include a selection unit 704.

The selection unit 704 is configured to receive, through a display screen, a mode selection instruction inputted by a user, to select the out-of-vehicle karaoke mode.

Optionally, the multimedia host 700 may further include a setting unit 705 and a signal processing unit 706.

The setting unit 705 is configured to set the voice microphone as a prime focus in an intelligent voice mode or a Bluetooth phone mode. When the voice microphone is set as the prime focus, voice collected by the voice microphone is allowed to produce sound through a speaker, and voice collected by the mobile microphone is prohibited from producing sound through a speaker.

The signal processing unit 706 is configured to process a second voice signal collected by the voice microphone, and output a processed signal to the in-vehicle speaker after performing amplification processing through the power amplifier, to drive the in-vehicle speaker to produce sound.

The setting unit 705 is further configured to set, the mobile microphone as a prime focus in the out-of-vehicle karaoke mode. When the mobile microphone is set as the prime focus, voice collected by the mobile microphone is allowed to produce sound through the speaker, and voice collected by the voice microphone is prohibited from producing sound through the speaker.

The fusion processing unit 702 is further configured to fuse the first voice signal and an accompaniment signal, and output a fused signal to an out-of-vehicle speaker after performing amplification processing through a power amplifier, to drive the out-of-vehicle speaker to produce sound.

Optionally, a priority of the intelligent voice mode is higher than a priority of the out-of-vehicle karaoke mode, and a priority of the Bluetooth phone mode is higher than the priority of the out-of-vehicle karaoke mode. When there is a conflict between at least two modes, a mode with a higher priority is preferentially entered.

Optionally, the priority of the Bluetooth phone mode is higher than the priority of the intelligent voice mode.

The receiving unit 701 in this embodiment of the present disclosure may be the USB interface in the multimedia host, and the fusion processing unit 702, the amplification processing unit 703, the selection unit 704, the setting unit 705, and the signal processing unit 706 may be processors in the multimedia host.

In this embodiment of the present disclosure, in the out-of-vehicle karaoke mode, the out-of-vehicle speaker may produce sound, to improve user's experience of out-of-vehicle karaoke, and user's multi-scenario requirements.

Figure 8:
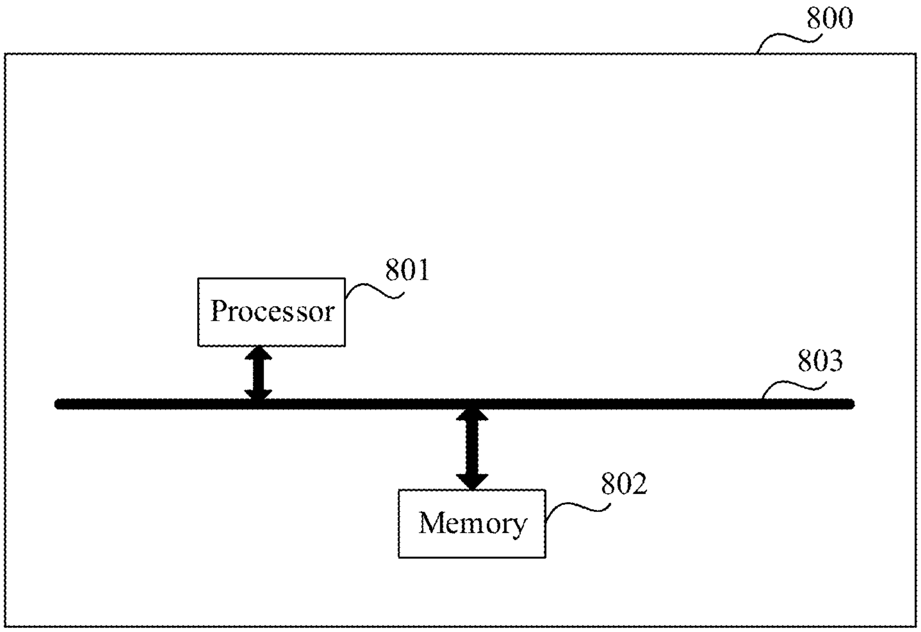
FIG. 8 is a schematic structural diagram of a multimedia host according to another embodiment of the present disclosure.

Referring to FIG. 8, FIG. 8 is a schematic structural diagram of a multimedia host according to another embodiment of the present disclosure. As shown in FIG. 8, the multimedia host 800 includes a processor 801 and a non-transitory computer-readable storage medium, e.g., a memory 802. The processor 801 and the memory 802 may be connected to each other through a communication bus 803. The communication bus 803 may be a peripheral component interconnect (PCI) bus, an extended industry standard architecture (EISA) bus, or the like. The communication bus 803 may be classified into an address bus, a data bus, a control bus, and the like. For ease of indication, the bus in FIG. 8 is represented by using only one bold line, but it does not indicate that there is only one bus or one type of bus. The memory 802 is configured to store a computer program, and the computer program includes program instructions. The processor 801 is configured to invoke the program instructions. The program includes some or all steps in the method in FIG. 2 to FIG. 6.

The processor 801 may be a general central processing unit (CPU), a microprocessor, an application-specific integrated circuit (ASIC), or one or more integrated circuits configured to control execution of a program in the solutions.

The memory 802 may be a read-only memory (read-only memory, ROM) or another type of static storage device that can store static information and a static instruction; or a random access memory (random access memory, RAM) or another type of dynamic storage device that can store information and an instruction; or may be an electrically erasable programmable read-only memory (EEPROM), a compact disc read-only memory (CD-ROM) or another compact disc storage medium, optical disc storage medium (including a compact disc, a laser disc, an optical disc, a digital versatile disc, a Blu-ray disc, or the like) and magnetic disk storage medium, another magnetic storage device, or any other medium that can be configured to carry or store expected program code in a form of an instruction or a data structure and that is accessible to a computer, but is not limited thereto. The memory may independently exist and be connected to the processor by using the bus. Alternatively, the memory may be integrated with the processor.

In addition, the multimedia host 800 may further include a communication interface (for example, a USB interface, a microphone interface, or the like), an antenna, and other general components. Details are not described herein again.

In this embodiment of the present disclosure, in the out-of-vehicle karaoke mode, the out-of-vehicle speaker may produce sound, to improve user's experience of out-of-vehicle karaoke, and user's multi-scenario requirements.

An embodiment of the present disclosure further provides a computer-readable storage medium. The computer-readable storage medium stores a computer program for electronic data interchange, and the computer program enables a computer to perform some or all steps of any vehicle-mounted audio playing method described in the method embodiments.

An embodiment of the present disclosure further provides a computer program product. The computer program product includes a non-transitory computer-readable storage medium storing a computer program, and the computer program is operable to enable a computer to perform some or all steps of any vehicle-mounted audio playing method described in the method embodiments. The computer program product may be a software installation package, and the computer includes a multimedia host.

It is to be noted that, for ease of description, the foregoing method embodiments are stated as a series of action combinations. However, a person skilled in the art is to learn that the present disclosure is not limited to the described sequence of the actions, because according to the present disclosure, some steps may be performed in another sequence or may be simultaneously performed. In addition, a person skilled in the art is further to understand that the embodiments described in this specification are all exemplary embodiments, and the involved actions and modules are not necessarily required by the present disclosure.

In the foregoing embodiments, description of each embodiment focuses on a different part, and for parts that are not described in detail in one embodiment, reference may be made to the related description of other embodiments.

In the embodiments provided in the present disclosure, it should be understood that the disclosed apparatus may be implemented in another manner. For example, the described apparatus embodiment is merely schematic. For example, the unit division is merely a logical function division and may be other division during actual implementation. For example, multiple units or components may be combined or integrated into another system, or some features may be ignored or not performed. In addition, the displayed or discussed mutual couplings or direct couplings or communication connections may be implemented by some interfaces; indirect couplings or communication connections between apparatuses or units which may be electric or in other forms.

The units described as separate parts may or may not be physically separate, and the parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The foregoing integrated unit may be implemented in a form of hardware, or may be implemented in a form of a software program module.

When the integrated unit is implemented in the form of a software program module and sold or used as an independent product, the integrated unit may be stored in a computer-readable memory. Based on such an understanding, the technical solutions of the present disclosure essentially, or the part contributing to the related art, or some of the technical solutions may be implemented in a form of a software product. The computer software product is stored in a memory and includes several instructions for instructing a computer device (which may be a personal computer, a server, a network device, or the like) to perform all or some of the steps of the methods described in the embodiments of the present disclosure. The memory includes any medium that may store program code, such as a USB flash disk, a read-only memory (ROM), a random access memory (RAM), removable hard disk, a magnetic disk, or an optical disc.

A person of ordinary skill in the art may understand that all or some of the steps of the methods in the foregoing embodiments can be implemented by a program instructing relevant hardware. The program may be stored in a computer-readable memory, and the memory may include a flash drive, a read-only memory, a random access memory, a magnetic disk, a compact disc, and the like.

The embodiments of the present disclosure are described in detail above. The principles and implementations of the present disclosure are described through specific examples in this specification, and the descriptions of the embodiments are only intended to help understand the methods and core ideas of the present disclosure. Meanwhile, a person of ordinary skill in the art may make modifications to the specific implementations and application scopes according to the ideas of the present disclosure. In conclusion, the content of the specification should not be construed as a limitation to the present disclosure.

What is claimed is:

1. A vehicle-mounted audio playing method, to be applied to a vehicle-mounted audio playing apparatus, wherein the vehicle-mounted audio playing apparatus comprises a voice microphone, a mobile microphone, a receiver, a multimedia host, a power amplifier, and an out-of-vehicle speaker, a working mode of the vehicle-mounted audio playing apparatus comprises an intelligent voice mode, a Bluetooth phone mode, and an out-of-vehicle karaoke mode, the multimedia host is configured to perform operations corresponding to the working mode, and the method comprises:

obtaining, by the multimedia host through the receiver, a first voice signal collected by the mobile microphone; and when the vehicle-mounted audio playing apparatus is in the intelligent voice mode or the Bluetooth phone mode, setting, by the multimedia host, the voice microphone as a prime focus; and when the vehicle-mounted audio playing apparatus is in the out-of-vehicle karaoke mode, setting, by the multimedia host, the mobile microphone as the prime focus, fusing, by the multimedia host, the first voice signal and an accompaniment signal, and outputting a fused signal to the out-of-vehicle speaker after performing amplification processing through the power amplifier, to drive the out-of-vehicle speaker to produce sound.

2. The method according to claim 1, wherein the vehicle-mounted audio playing apparatus further comprises an in-vehicle speaker, and the fused signal is further amplified through the power amplifier and then outputted to the in-vehicle speaker, to drive the in-vehicle speaker to produce sound.

3. The method according to claim 2, further comprising:

when the vehicle-mounted audio playing apparatus is in an out-of-vehicle lecture mode, outputting, by the multimedia host, the first voice signal to the out-of-vehicle speaker after performing amplification processing through the power amplifier, to drive the out-of-vehicle speaker to produce sound; or outputting, by the multimedia host, the first voice signal to the out-of-vehicle speaker and the in-vehicle speaker after performing amplification processing through the power amplifier, to drive the out-of-vehicle speaker and the in-vehicle speaker to produce sound.

4. The method according to claim 2, further comprising:

when the vehicle-mounted audio playing apparatus is in an in-vehicle karaoke mode, fusing, by the multimedia host, the first voice signal and the accompaniment signal, and outputting a fused signal to the in-vehicle speaker after performing amplification processing through the power amplifier, to drive the in-vehicle speaker to produce sound; and when the vehicle-mounted audio playing apparatus is in an in-vehicle lecture mode, outputting, by the multimedia host, the first voice signal to the in-vehicle speaker after performing amplification processing through the power amplifier, to drive the in-vehicle speaker to produce sound.

5. The method according to claim 1, wherein the fusing, by the multimedia host, the first voice signal and an accompaniment signal comprises:

performing, by the multimedia host, audio mixing processing on the first voice signal and the accompaniment signal; or performing, by the multimedia host, tuning processing on the first voice signal and the accompaniment signal, and performing audio mixing processing on the first voice signal on which the tuning processing is performed and the accompaniment signal on which audio the tuning processing is performed.

6. The method according to claim 1, wherein the vehicle-mounted audio playing apparatus further comprises a display screen; and the multimedia host receives, through the display screen, a mode selection instruction inputted by a user.

7. The method according to claim 2, wherein voice collected by a microphone that is set as the prime focus is allowed to produce sound through a speaker, and voice collected by a microphone that is not set as the prime focus is prohibited from producing sound through a speaker.

8. The method according to claim 7, further comprising:

when the vehicle-mounted audio playing apparatus is in the intelligent voice mode or the Bluetooth phone mode, processing, by the multimedia host, a second voice signal collected by the voice microphone, and outputting a processed signal to the in-vehicle speaker after performing amplification processing through the power amplifier, to drive the in-vehicle speaker to produce sound.

9. The method according to claim 8, wherein a priority of the intelligent voice mode is higher than a priority of the out-of-vehicle karaoke mode, and a priority of the Bluetooth phone mode is higher than the priority of the out-of-vehicle karaoke mode; and when there is a conflict between at least two modes, a mode with a higher priority is entered.

10. A vehicle-mounted audio playing apparatus, comprising: a voice microphone, a mobile microphone, a receiver, a multimedia host, a power amplifier, and an out-of-vehicle speaker, wherein a working mode of the vehicle-mounted audio playing apparatus comprises an intelligent voice mode, a Bluetooth phone mode, and an out-of-vehicle karaoke mode, and the multimedia host is configured to perform operations corresponding to the working mode;

the multimedia host being configured to obtain, through the receiver, a first voice signal collected by the mobile microphone; and the multimedia host being further configured to: when the vehicle-mounted audio playing apparatus is in the intelligent voice mode or the Bluetooth phone mode, set the voice microphone as a prime focus; and when the vehicle-mounted audio playing apparatus is in the out-of-vehicle karaoke mode, set the mobile microphone as the prime focus, fuse the first voice signal and an accompaniment signal, and output a fused signal to the out-of-vehicle speaker after performing amplification processing through the power amplifier, to drive the out-of-vehicle speaker to produce sound.

11. The apparatus according to claim 10, further comprising an in-vehicle speaker, and the fused signal being further amplified through the power amplifier and then outputted to the in-vehicle speaker, to drive the in-vehicle speaker to produce sound.

12. The apparatus according to claim 10, further comprising a display screen; and the multimedia host being further configured to receive, through the display screen, a mode selection instruction inputted by a user, to select the out-of-vehicle karaoke mode.

13. The apparatus according to claim 10, wherein when the voice microphone is set as the prime focus, voice collected by the voice microphone is allowed to produce sound through a speaker, and voice collected by the mobile microphone is prohibited from producing sound through a speaker; and wherein when the mobile microphone is set as the prime focus, voice collected by the mobile microphone is allowed to produce sound through the speaker, and voice collected by the voice microphone is prohibited from producing sound through the speaker.

14. A multimedia host for a vehicle-mounted audio playing apparatus, comprising a processor and a non-transitory computer-readable storage medium storing instructions executable by the processor to cause the multimedia host to perform operations comprising:

obtaining a first voice signal collected by a mobile microphone of the vehicle-mounted audio playing apparatus;

when the vehicle-mounted audio playing apparatus is in an intelligent voice mode or an Bluetooth phone mode, setting a voice microphone of the vehicle-mounted audio playing apparatus as a prime focus; and setting the mobile microphone as the prime focus, when the vehicle-mounted audio playing apparatus is in an out-of-vehicle karaoke mode, fusing the first voice signal and an accompaniment signal, and outputting a fused signal to an out-of-vehicle speaker after performing amplification processing through a power amplifier, to drive the out-of-vehicle speaker to produce sound;

when the vehicle-mounted audio playing apparatus is in an out-of-vehicle lecture mode, outputting the first voice signal to the out-of-vehicle speaker after performing amplification processing through the power amplifier, to drive the out-of-vehicle speaker to produce sound;

when the vehicle-mounted audio playing apparatus is in an in-vehicle karaoke mode, fusing the first voice signal and the accompaniment signal, and outputting a fused signal to an in-vehicle speaker after performing amplification processing through the power amplifier, to drive the in-vehicle speaker to produce sound; and when the vehicle-mounted audio playing apparatus is in an in-vehicle lecture mode, outputting the first voice signal to the in-vehicle speaker after performing amplification processing through the power amplifier, to drive the in-vehicle speaker to produce sound.

15. The multimedia host according to claim 14, wherein the fusing; the first voice signal and an accompaniment signal comprises:

performing audio mixing processing on the first voice signal and the accompaniment signal.

16. The multimedia host according to claim 14, wherein the fusing the first voice signal and an accompaniment signal comprises:

performing tuning processing on the first voice signal and the accompaniment signal, and performing audio mixing processing on the first voice signal on which the tuning processing is performed and the accompaniment signal on which audio the tuning processing is performed.

17. The multimedia host according to claim 14, wherein voice collected by a microphone that is set as the prime focus is allowed to produce sound through a speaker, and voice collected by a microphone that is not set as the prime focus is prohibited from producing sound through a speaker.

18. The multimedia host according to claim 17, wherein the operations further comprise:

when the vehicle-mounted audio playing apparatus is in an intelligent voice mode or a Bluetooth phone mode, processing, by the multimedia host, a second voice signal collected by the voice microphone, and outputting a processed signal to the in-vehicle speaker after performing amplification processing through the power amplifier, to drive the in-vehicle speaker to produce sound.

19. The multimedia host according to claim 18, wherein a priority of the intelligent voice mode is higher than a priority of the out-of-vehicle karaoke mode, and a priority of the Bluetooth phone mode is higher than the priority of the out-of-vehicle karaoke mode; and when there is a conflict between at least two modes, a mode with a higher priority is entered.

* * * * *